United States Patent
Kim et al.

(10) Patent No.: US 10,746,842 B2
(45) Date of Patent: Aug. 18, 2020

(54) METHOD AND APPARATUS FOR TRANSMITTING INFORMATION FOR POSITION MEASUREMENT

(71) Applicant: LG Electronics Inc., Seoul (KR)

(72) Inventors: Myeongjin Kim, Seoul (KR); Sangrim Lee, Seoul (KR); Hojae Lee, Seoul (KR); Dongkyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/489,445

(22) PCT Filed: Oct. 10, 2017

(86) PCT No.: PCT/KR2017/011113
§ 371 (c)(1),
(2) Date: Aug. 28, 2019

(87) PCT Pub. No.: WO2018/159913
PCT Pub. Date: Sep. 7, 2018

(65) Prior Publication Data
US 2020/0041604 A1    Feb. 6, 2020

Related U.S. Application Data

(60) Provisional application No. 62/464,386, filed on Feb. 28, 2017.

(51) Int. Cl.
*H04W 24/00* (2009.01)
*G01S 5/00* (2006.01)
*G01S 5/10* (2006.01)

(52) U.S. Cl.
CPC .............. *G01S 5/0036* (2013.01); *G01S 5/10* (2013.01)

(58) Field of Classification Search
None
See application file for complete search history.

(56) References Cited

U.S. PATENT DOCUMENTS

| | | | |
|---|---|---|---|
| 2002/0049063 A1* | 4/2002 | Nohara | H04W 64/00 455/456.1 |
| 2006/0239391 A1* | 10/2006 | Flanagan | H04W 56/00 375/354 |

(Continued)

FOREIGN PATENT DOCUMENTS

| | | |
|---|---|---|
| JP | 2013126238 | 6/2013 |
| KR | 1019990077584 | 10/1999 |

(Continued)

OTHER PUBLICATIONS

PCT International Search Report and Written Opinion in International Application No. PCT/KR2017/011113, dated Jan. 10, 2018 (with English translation).

*Primary Examiner* — Erika A Washington
(74) *Attorney, Agent, or Firm* — Fish & Richardson P.C.

(57) ABSTRACT

A method for transmitting information for position measurement by a terminal in a wireless communication system. The method for transmitting information for position measurement by a terminal may include the steps of: receiving a reference signal from a base station; and transmitting information for position measurement to the base station on the basis of the reference signal. The information for the position measurement may be information related to a phase difference of arrival (PDOA). The terminal is capable of communicating with at least one of another terminal, a terminal related to an autonomous driving vehicle, the base station or a network.

17 Claims, 10 Drawing Sheets

(56) References Cited

U.S. PATENT DOCUMENTS

2013/0295944 A1* 11/2013 Saur .................. H04W 16/28
                                                            455/450
2014/0355466 A1* 12/2014 Rajakarunanayake ......................
                                                            H04W 24/00
                                                            370/252

FOREIGN PATENT DOCUMENTS

| KR | 1020030083225 | 10/2003 |
| KR | 1020050023088 | 3/2005 |
| KR | 1020110019328 | 2/2011 |

* cited by examiner

FIG. 7
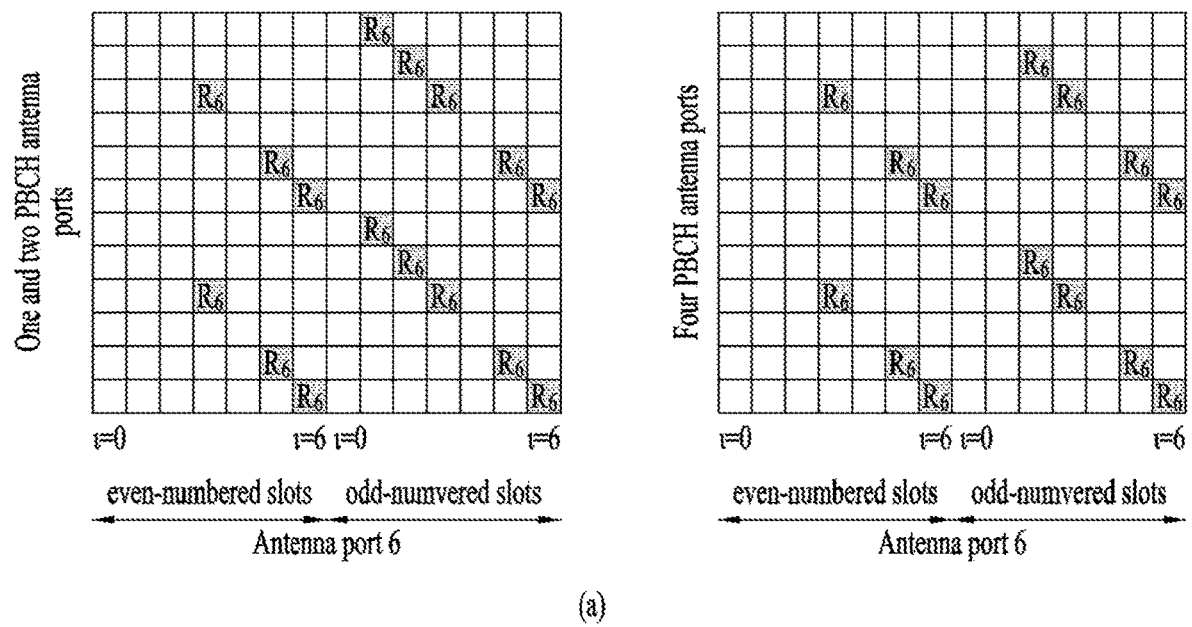
(a)
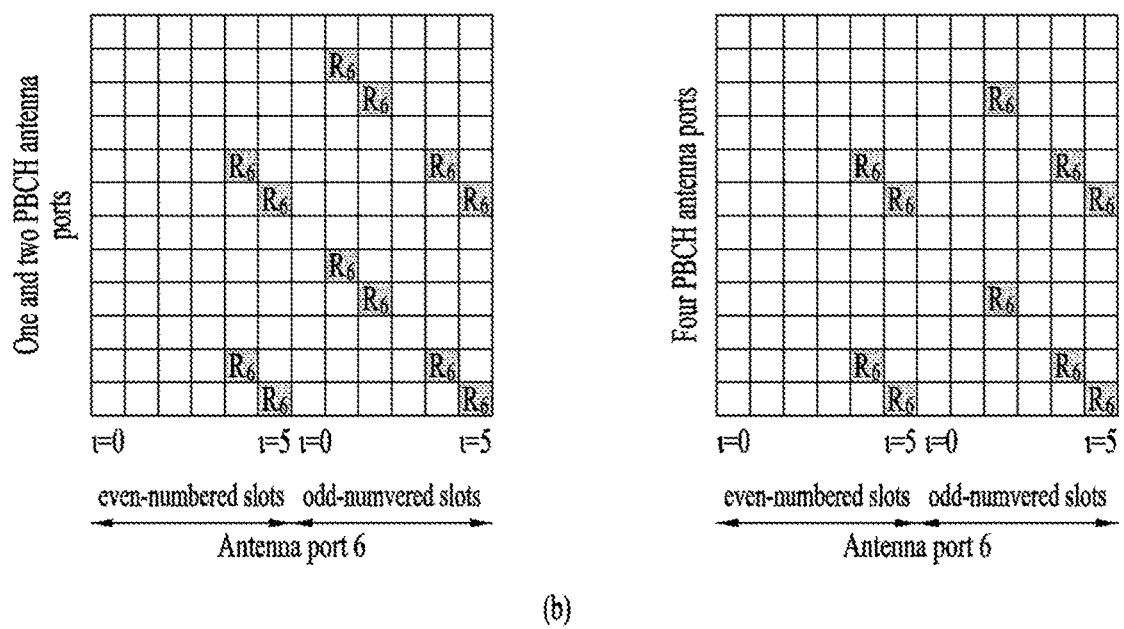
(b)

METHOD AND APPARATUS FOR TRANSMITTING INFORMATION FOR POSITION MEASUREMENT

CROSS-REFERENCE TO RELATED APPLICATIONS

This application is a National Stage application under 35 U.S.C. § 371 of International Application No. PCT/KR2017/011113, filed on Oct. 10, 2017, which claims the benefit of U.S. Provisional Application No. 62/464,386, filed on Feb. 28, 2017. The disclosures of the prior applications are incorporated by reference in their entirety.

TECHNICAL FIELD

The present disclosure relates to a wireless communication system, and more particularly, to a method and apparatus for transmitting information for position estimation

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms. The 5G technology requires an eNB to have more UE connectivity and it is anticipated that the connectivity required by the 5G is going to be increased up to maximum 1,000,000/km2.

As more communication devices require greater communication capacity, necessity for mobile broadband communication, which is enhanced compared to a legacy radio access technology (RAT), is emerging. Moreover, discussion on a communication system to be designed in consideration of a service/UE sensitive to reliability and latency is in progress. Introduction of a next generation radio access technology (RAT) is being discussed in consideration of the enhanced mobile broadband communication (eMBB), the massive MTC (mMTC), URLLC (ultra-reliable and low latency communication), and the like. In the following, for clarity, the technology is referred to as a New RAT.

DISCLOSURE

Technical Problem

An object of the present disclosure is to provide a method and apparatus for obtaining position information based on phase information in a wireless communication system.

Another object of the present disclosure is to provide a method of transmitting information related to position estimation.

A further object of the present disclosure is to provide a method of transmitting information for position estimation based on phase difference of arrival (PDOA).

Technical Solution

In an aspect of the present disclosure, provided herein is a method of transmitting information for position estimation by a user equipment (UE) in a wireless communication system. The method may include receiving a reference signal from a base station (BS) and transmitting the information for the position estimation to the BS based on the reference signal. In this case, the information for the position estimation may correspond to information related to PDOA.

In another aspect of the present disclosure, provided herein is a UE for transmitting information for position estimation in a wireless communication system. The UE may include a receiving module configured to receive a signal, a transmitting module configured to transmit a signal, and a processor configured to control the receiving module and the transmitting module. The processor may be further configured to receive a reference signal from a BS using the receiving module and transmit the information for the position estimation to the BS based on the reference signal using the transmitting module. In this case, the information for the position estimation may correspond to information related to PDOA.

The following items may be commonly applied to the method and apparatus for position estimation in a wireless communication system.

The PDOA-related information may include information on direction of arrival (DOA) capability of the UE.

Only when one BS is involved in estimating the position of the UE, the PDOA-related information may include the information on the DOA capability of the UE.

The PDOA-related information may correspond to phase difference information.

When the position estimation is performed based on the PDOA, the UE may receive reference signals on a first frequency and a second frequency. The phase difference information may correspond to information about a phase difference between the reference signal received on the first frequency and the reference signal received on the second frequency.

The PDOA-related information may further include at least one of power and signal strength of the reference signal received on the first frequency and power and signal strength of the reference signal received on the second frequency.

When the position estimation is performed based on the PDOA, the UE may receive reference signals on two or more frequencies and determine the phase difference information based on phase differences between the reference signals received on the two or more frequencies.

The phase difference information may be determined based on a phase difference between two reference signals with highest power among the reference signals received on the two or more frequencies.

When a plurality of BSs are involved in estimating the position of the UE, the PDOA-related information may include PDOA information for the plurality of BSs.

The UE may receive reference signals from the plurality of BSs and determine the PDOA information for the plurality of BSs based on the received reference signals.

The PDOA-related information may further include identification information on each of the plurality of BSs.

Advantageous Effects

The present disclosure can provide a method of obtaining position information based on phase information in a wireless communication system.

The present disclosure can provide a method of transmitting information related to position estimation.

The present disclosure can provide a method of transmitting information for position estimation based on PDOA.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

FIG. 7 is a diagram illustrating a method of mapping a PRS to a resource element.

BEST MODE

Figure 1:
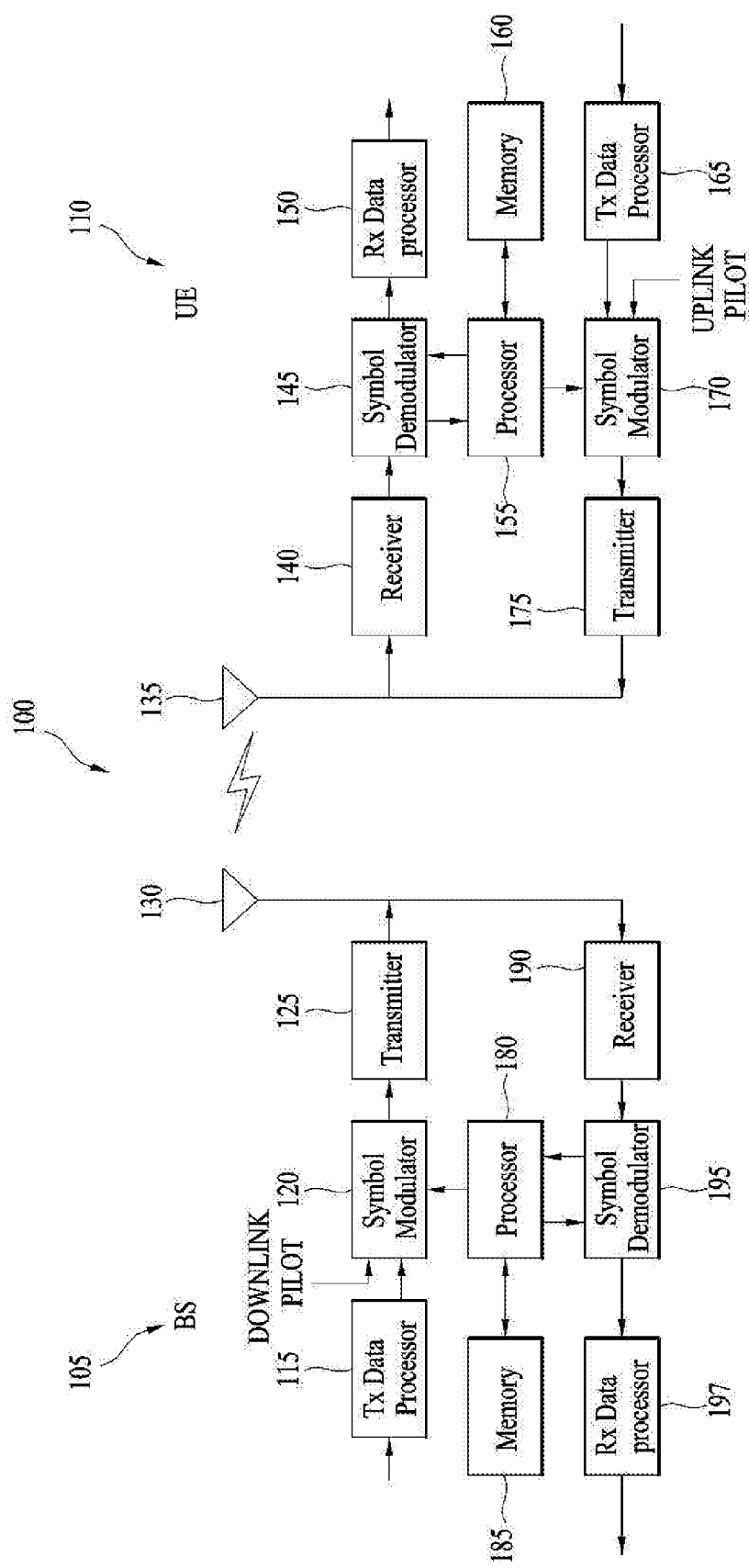
FIG. 1 is a block diagram illustrating the configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes a 3rd Generation Partnership Project (3GPP) Long Term Evolution (LTE) system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on 3GPP LTE system or 3GPP LTE-A system, contents of the present invention may be applicable to various kinds of other communication systems.

In a mobile communication system, a UE is able to receive information in Downlink (DL) and is able to transmit information in Uplink (UL) as well. Information transmitted or received by the UE may include various kinds of data and control information. In accordance with types and usages of the information transmitted or received by the UE, various physical channels may exist.

The following descriptions are usable for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like. CDMA can be implemented by such a radio technology as Universal Terrestrial Radio access (UTRA), CDMA 2000 and the like. TDMA can be implemented with such a radio technology as Global System for Mobile communications/General Packet Radio Service/Enhanced Data Rates for GSM Evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of Universal Mobile Telecommunications System (UMTS).

3GPP LTE is a part of Evolved UMTS (E-UMTS) that uses E-UTRA. The 3GPP LTE employs OFDMA in DL and SC-FDMA in UL. And, LTE-A is an evolved version of 3GPP LTE.

Moreover, in the following description, specific terminologies are provided to help the understanding of the present invention. And, the use of the specific terminology can be modified into another form within the scope of the technical idea of the present invention.

Regarding wireless transmission between a BS and a UE, transmission from the BS to the UE and transmission from the UE to the BS are referred to as DL transmission and UL transmission, respectively. A scheme of distinguishing between radio resources for DL and UL transmission is defined as duplex. When frequency bands are divided into DL transmission bands and UL transmission bands to perform bidirectional transmission and reception, it is referred to as frequency division duplex (FDD). In addition, when time resources are divided into DL transmission resources and UL transmission resources to perform the bidirectional transmission and reception, it is referred to as time division duplex (TDD). When time and frequency resources are shared to perform the bidirectional transmission and reception, it is referred to as full duplex. It is apparent that the method proposed in the present disclosure operates not only in the FDD but also in the TDD or full duplex.

FIG. 1 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 1, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197.

In addition, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present invention supports a Multiple Input Multiple Output (MIMO) system. And, the BS 105 according to the present invention may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values. The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof.

In the implementation by hardware, the processor 155/180 may be provided with such a device configured to implement the present invention as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel. Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
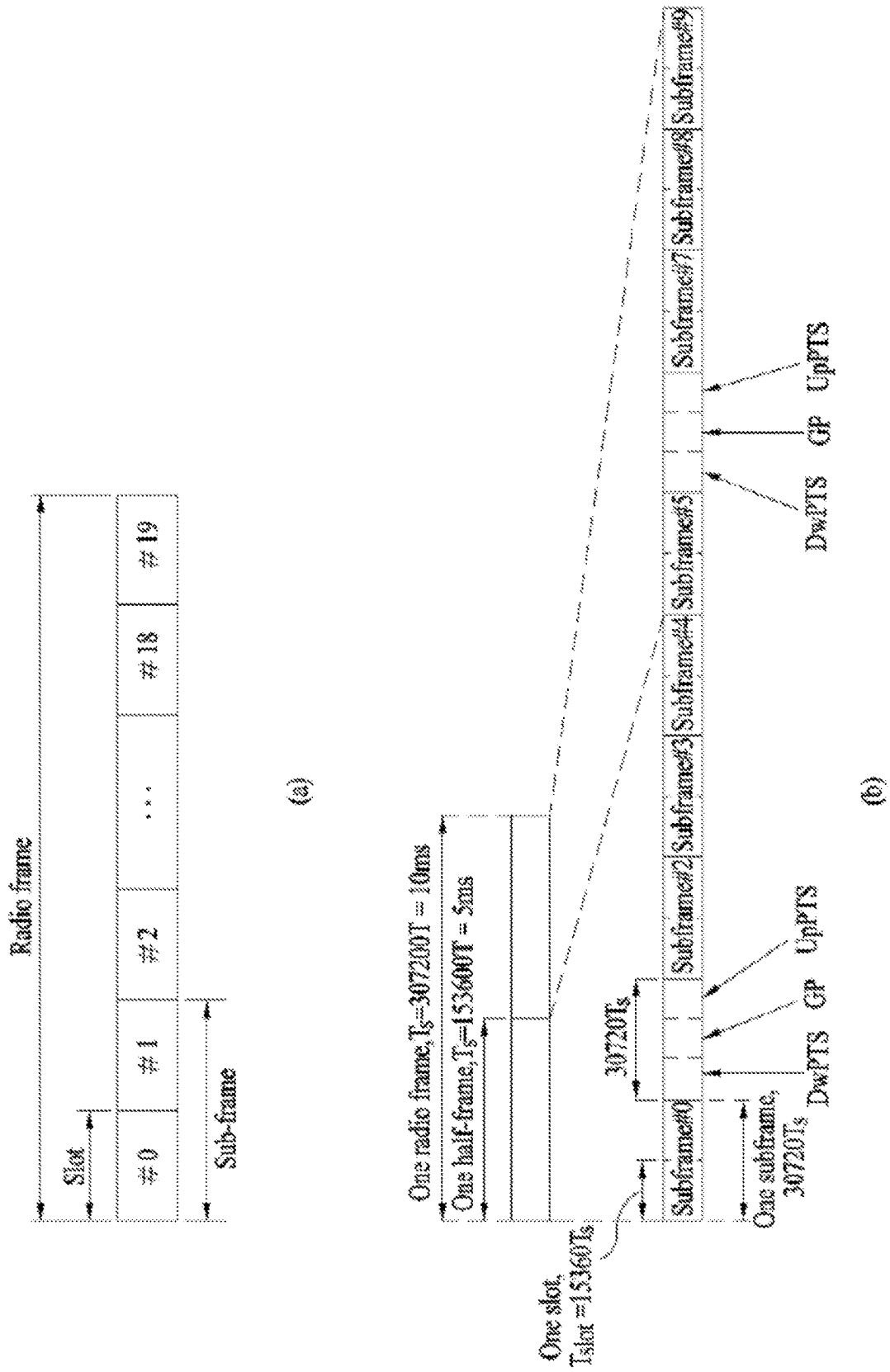
FIG. 2 illustrates the structure of a radio frame used in a wireless communication system.

FIG. 2 is a diagram for an example of a radio frame structure used in a wireless communication system. Specifically, FIG. 2 (a) illustrates an exemplary structure of a radio frame which can be used for frequency division multiplexing (FDD) in 3GPP LTE/LTE-A system and FIG. 2 (b) illustrates an exemplary structure of a radio frame which can be used for time division multiplexing (TDD) in 3GPP LTE/LTE-A system.

Referring to FIG. 2, a 3GPP LTE/LTE-A radio frame is 10 ms (307,200 Ts) in duration. The radio frame is divided into 10 subframes of equal size. Subframe numbers may be assigned to the 10 subframes within one radio frame, respectively. Here, Ts denotes sampling time where Ts=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time period reserved for DL transmission and UpPTS is a time period reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 2-continued

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Figure 3:
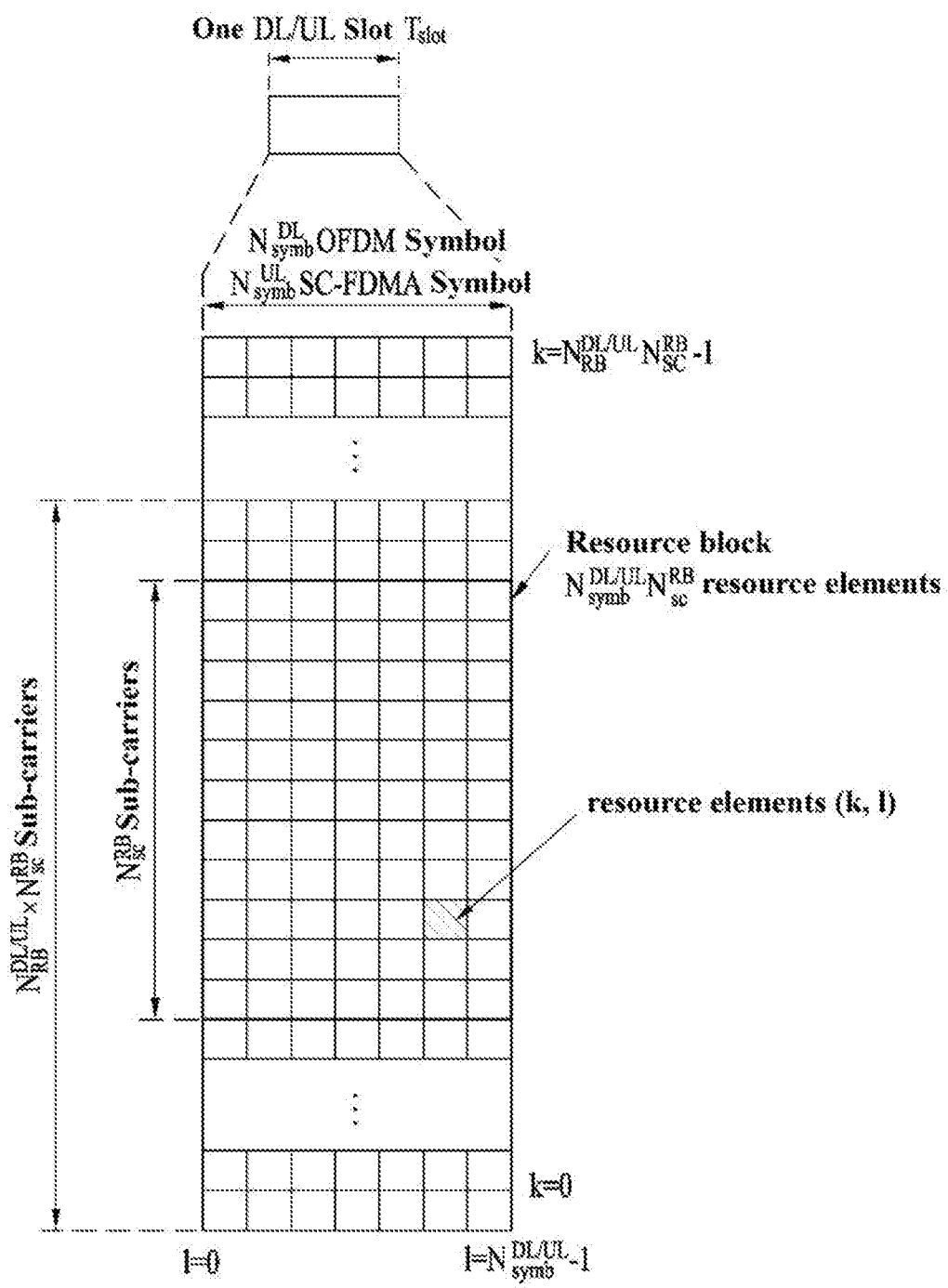
FIG. 3 illustrates the structure of a downlink/uplink (DL/UL) slot in a wireless communication system.

Referring to FIG. 3, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 3, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 3 for convenience of description, embodiments of the present invention are similarly applicable to subframes having a different number of OFDM symbols. Referring to FIG. 3, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). A VRB corresponds to a logical resource allocation unit which is introduced to allocate a resource. The VRB has a size identical to a size of a PRB. The VRB is classified into a localized type VRB and a distributed type VRB according to a scheme of mapping the VRB to a PRB. Since VRBs of the localized type are directly mapped to PRBs, a VRB number (or VRB index) directly corresponds to a PRB number. In particular, it becomes $n_{PRB} = n_{VRB}$. Numbers ranging from 0 to $N^{DL}_{PRB} - 1$ are assigned to the VRBs of the localized type and $N^{DL}_{VRB} = N^{DL}_{RB}$. Hence, according to the localized mapping scheme, a VRB having the same VRB number is mapped to a PRB of the same PRB number in a first slot and a second slot. On the contrary, a VRB of the distributed type is mapped to a PRB by passing through interleaving. Hence, a VRB of the distributed type including the same VRB number can be mapped to PRBs of a different number in a first slot and a second slot. Two PRBs each of which is located at each slot of a subframe and having the same VRB number are referred to as a VRB pair.

Figure 4:
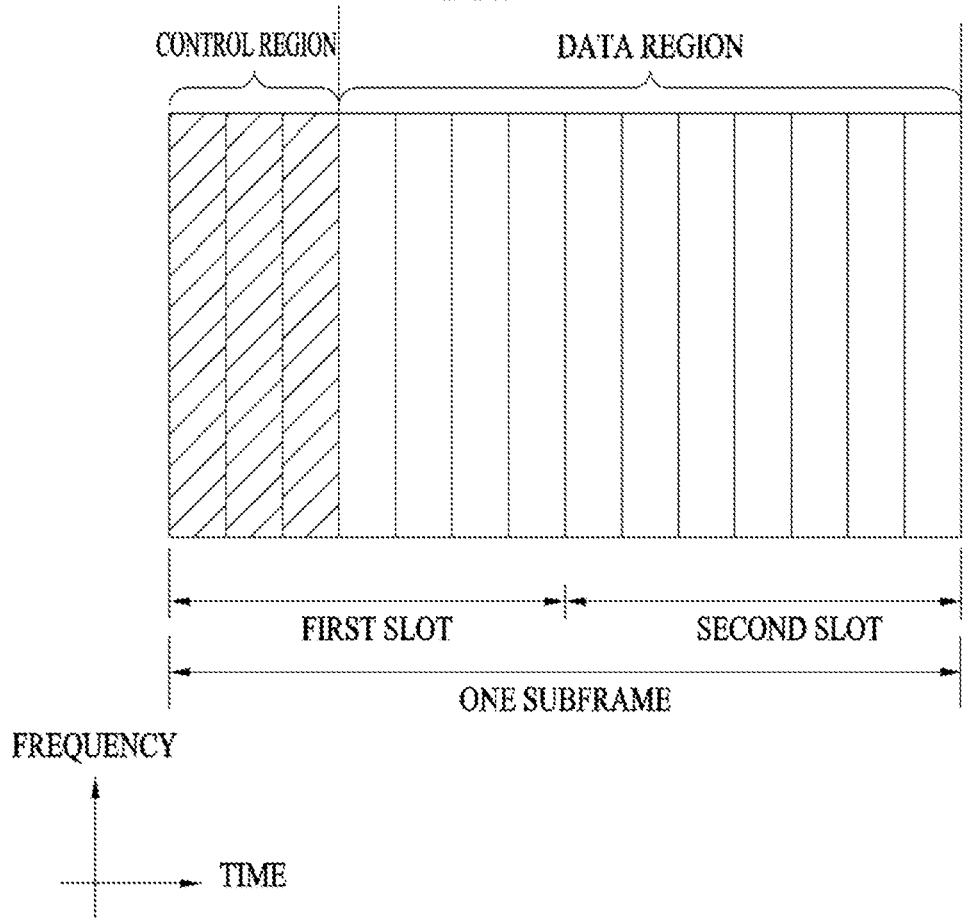
FIG. 4 illustrates the structure of a downlink (DL) subframe used in the 3GPP LTE/LTE-A system.

FIG. 4 illustrates a structure of a DL subframe used in 3GPP LTE/LTE-A system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PCFICH carries a HARQ (Hybrid Automatic Repeat Request) ACK/NACK (acknowledgment/negative-acknowledgment) signal in response to UL transmission.

Control information transmitted on a PDCCH is referred to as downlink control information (DCI). The DCI includes resource allocation information for a UE or UE group and other control information. For example, the DCI includes transmit format and resource allocation information of a downlink shared channel (DL-SCH), transmit format and resource allocation information of an uplink shared channel (UL-SCH), paging information of a paging channel (PCH), system information on a DL-SCH, resource allocation information of a upper layer control message such as a random access response transmitted on PDSCH, a transmit power control command for individual UEs belonging to a UE group, a transmit power control command, activation indication information of VoIP (Voice over IP), a DAI (downlink assignment index), and the like. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

In general, a DCI format capable of being transmitted to a UE varies depending on a transmission mode (TM) set to the UE. In other word, if a UE is configured by a specific transmission mode, it may be able to use a prescribed DCI format(s) corresponding to the specific transmission mode only rather than all DCI formats.

A PDCCH is formed by aggregating one or more consecutive Control Channel Elements (CCEs). A CCE is a logical allocation unit used to provide a PDCCH at a coding rate based on the state of a radio channel. A CCE corresponds to a plurality of resource element groups (REGs). For example, one CCE corresponds to 9 REGs and one REG corresponds to 4 REs. 3GPP LTE defines a CCE set where PDCCH is able to be positioned for each of the user equipments. The CCE set for which a user equipment is able to search its own PDCCH is called a PDCCH search space, simply a search space (SS). An individual resource to which PDCCH is able to be transmitted thereto within the SS is called a PDCCH candidate. A set of PDCCH candidates to be monitored by a UE is defined as a search space. In 3GPP LTE/LTE-A system, a search space for each DCI format may have a different size and a dedicated search space and a common search space are separately defined. The dedicated search space corresponds to a UE-specific search space and may be individually set for each of user equipments. The common search space is configured for a plurality of UEs. Aggregation levels for defining the search space are shown in the following.

TABLE 3

| Type | Search Space $SK^{(L)}$ | | Number of PDCCH candidates $M^{(L)}$ |
|---|---|---|---|
| | Aggregation Level L | Size in CCEs | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to a CCE aggregation level. An eNB transmits actual PDCCH (DCI) in a random PDCCH candidate belonging to a search space and a UE monitors the search space to find out PDCCH (DCI). In this case, the verb 'monitor' means that the UE attempts to decode each of the PDCCH candidates belonging to the search space in accordance with PDCCH formats monitored by the UE. The UE monitors a plurality of PDCCHs and may be able to detect PDCCH of the UE. Basically, since the UE is unable to know a position from which the PDCCH of the UE is transmitted, the UE attempts to decode all PDCCHs of a corresponding DCI format in every subframe until PDCCH including an identifier of the UE is detected. This process is referred to as blind detection (or blind decoding) (BD).

An eNB can transmit data for a UE or a UE group via a data region. The data transmitted via the data region is referred to as a user data. In order to transmit the user data, PDSCH (physical downlink shared channel) can be assigned to the data region. PCH (paging channel) and DL-SCH (downlink-shared channel) are transmitted via the PDSCH. A UE decodes control information transmitted on the PDCCH to read the data transmitted via the PDSCH. Information indicating a UE or a UE group to which the data of the PDSCH is transmitted and information indicating a method for the UE or the UE group to receive and decode the PDSCH data are transmitted in a manner of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific DL subframe. In this case, a UE monitors a PDCCH using its own RNTI information, and if one or more UEs having "A" RNTI are present, the UEs receive the PDCCH and receive the PDSCH indicated by "B" and "C" through the information about the received PDCCH.

In order for a UE to demodulate a signal received from an eNB, it is necessary to have a reference signal (RS) to be compared with a data signal. The reference signal corresponds to a signal of a predetermined specific waveform transmitted to the UE by the eNB or to the eNB by the UE and is referred to as a pilot signal as well. Reference signals are classified into a cell-specific RS commonly used by all UEs in a cell and a demodulation RS (DM RS) dedicated to a specific UE. A DM RS transmitted by an eNB to demodulate downlink data of a specific UE is referred to as a UE-specific RS. In DL, it may transmit a DM RS and a CRS together or transmit either the DM RS or the CRS only. In this case, if the DM RS is transmitted only in DL without the CRS, since the DM RS, which is transmitted by applying the same precoder with data, is used for demodulation purpose only, it is necessary to separately provide an RS for measuring a channel. For example, in 3GPP LTE (-A), an additional RS for measuring a channel, i.e., a CSI-RS, is transmitted to a UE to make the UE measure channel state information. Unlike a CRS transmitted in every subframe, the CSI-RS is transmitted with a prescribed transmission period consisting of a plurality of subframes based on a fact that a channel state is not considerably changed over time.

Figure 5:
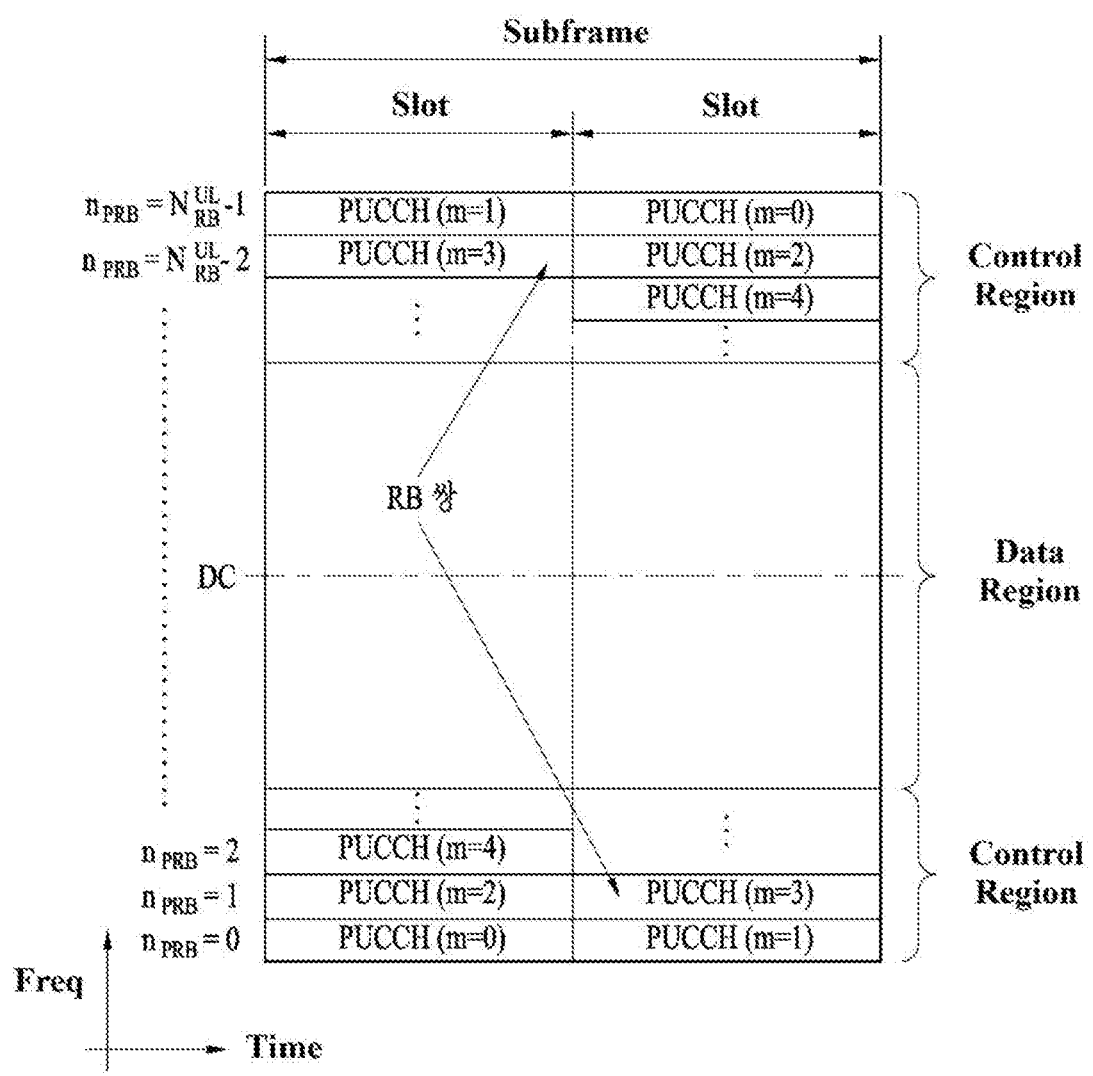
FIG. 5 illustrates the structure of an uplink (UL) subframe used in the 3GPP LTE/LTE-A system.

FIG. 5 is a diagram for an example of an uplink (UL) subframe structure used in 3GPP LTE/LTE-A system.

Referring to FIG. 5, an UL subframe can be divided into a control region and a data region in frequency domain. At least one PUCCH (physical uplink control channel) can be assigned to the control region to transmit uplink control information (hereinafter abbreviated UCI). At least one PUSCH (physical uplink shared channel) can be assigned to the data region to transmit user data.

In an UL subframe, subcarriers far from a DC (direct current) subcarrier are utilized as a control region. In other word, subcarriers positioned at both ends of an UL transmission bandwidth are assigned to transmit UCI. The DC subcarrier is a remaining component not used for transmitting a signal and mapped to a carrier frequency f0 in a frequency up converting process. PUCCH for one UE is assigned to an RB pair in one subframe. RBs belonging to the RB pair occupy a subcarrier different from each other in two slots, respectively. This sort of PUCCH can be represented in a manner that the RB pair allocated to the PUCCH is frequency hopped on a slot boundary. Yet, if a frequency hopping is not applied, the RB pair occupies an identical subcarrier.

PUCCH can be used for transmitting control information described in the following.

- SR (scheduling request): Information used for requesting uplink UL-SCH resource. OOK (on-off keying) scheme is used to transmit the SR.
- HARQ ACK/NACK: Response signal for PDCCH and/or a DL data packet (e.g., codeword) on PDSCH. This information indicates whether or not PDCCH or PDSCH is successfully received. HARQ-ACK 1 bit is transmitted in response to a single DL codeword. HARQ-ACK 2 bits are transmitted in response to two DL codewords. HARQ-ACK response includes a positive ACK (simple, ACK), a negative ACK (hereinafter, NACK), DTX (discontinuous transmission), or NACK/DTX. In this case, the term HARQ-ACK is used in a manner of being mixed with HARQ ACK/NACK, ACK/NACK.
- CSI (channel state information): Feedback information on a DL channel. MIMO (multiple input multiple output)-related feedback information includes an RI (rank indicator) and a PMI (precoding matrix indicator).

The amount of control information (UCI) capable of being transmitted by a UE in a subframe depends on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, the last SC-FDMA symbol of the subframe is also excluded. A reference signal is used for coherent detection of PUCCH. PUCCH supports various formats depending on transmitted information.

Table 4 in the following shows a mapping relation between a PUCCH format and UCI in LTE/LTE-A system.

TABLE 4

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACKNACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | COI/PMI/RI + ACK/NACK | Normal CP only |
| 2b | QPSK + QPSK | 22 | CQI/PMI/RI + ACK/NACK only | Normal CP |
| 3 | QPSK | 48 | ACK/NACK or SR + ACK/NACK or CQI/PMI/RI + ACK/NACK | |

Referring to Table 4, PUCCH format 1 is mainly used for transmitting ACK/NACK and PUCCH format 2 is mainly used for transmitting channel state information (CSI) such as CQI/PMI/RI, and PUCCH format 3 is mainly used for transmitting ACK/NACK information.

In general, in order for a network to obtain location information of a UE, various methods are used in a cellular communication system. As a representative method, a UE receives PRS (positioning reference signal) transmission-related configuration information of a base station from a higher layer signal and measures PRSs transmitted by cells adjacent to the UE to calculate location-related information of the UE using a positioning scheme such as OTDOA (observed time difference of arrival) and forwards the calculated information to the network. Besides, an assisted global navigation satellite system (A-GNSS) positioning scheme, enhanced cell-ID (E-CID) techniques, uplink time difference of arrival (UTDOA), and the like exist. The abovementioned positioning schemes can be utilized for various location-based services (e.g., advertising, location tracking, emergency communication means, etc.).

[LTE Positioning Protocol]

In LTE system, LPP (LTE positioning protocol) is defined to support the OTDOA scheme. According to the LPP, OTDOA-ProvideAssistanceData having a configuration described in the following is transmitted to a UE as an IE (information element).

TABLE 5

```
-- ASN1START
OTDOA-ProvideAssistanceData ::= SEQUENCE {
  otdoa-ReferenceCellInfo      OTDOA-ReferenceCellInfo
      OPTIONAL,   -- Need ON
  otdoa-NeighbourCellInfo      OTDOA-NeighbourCellInfoList
      OPTIONAL,   -- Need ON
  otdoa-Error
      OTDOA-Error
      OPTIONAL,
  --Need ON
  . . .
-- ASN1STOP
```

In this case, OTDOA-ReferenceCellInfo corresponds to a reference cell for measuring RSTD and can be configured as follows.

TABLE 6

```
-- ASN1START
OTDOA-ReferenceCetlinin ::= SEQUENCE {
    physCellId              INTEGER (0..503),
    cellGlobalId            ECGI
    OPTIONAL,           -- Need ON
    earfcnRef               ARFCN-ValueEUTRA
    OPTIONAL,           -- Cond NotSameAsServ0
    antennaPortConfig       ENUMERATED {ports1-or-2,
ports4, . . . }
    OPTIONAL,           -- Cond NotSameAsServ1
    cplength                ENUMERATED { normal,
extended, . . . },
    prsInfo                 PRS-Info
    OPTIONAL,           -- Cond PRS. . . ,
    [[ eartcnRef-v9a0       ARFCN-ValueEUTRA-v9a0
    OPTIONAL            -- Cond NotSameAsServ2]]
  }
-- ASN1STOP
```

In this case, conditional presences are shown in the following.

TABLE 7

| Conditional presence | description |
|---|---|
| NotSameAsServ0 | This field is absent if earfcnRef-v9a0 is present. Otherwise, the field is mandatory present if the EARFCN of the OTDOA assistance data reference cell is not the same as the EARFCN of the target devices's current primary cell. |
| NotSameAsServ1 | The field is mandatory present if the antenna port configuration of the OTDOA assistance data reference cell is not the same as the antenna port configuration of the target devices's current primary cell. |
| NotSameAsServ2 | The field is absent if earfcnRef is present. Otherwise, the field is mandatory present if the EARFCN of the OTDOA assistance data reference cell is not the same as the EARFCN of the target devices's current primary cell. |
| PRS | The field is mandatory present if positioning reference signals are available in the assistance data reference cell; otherwise it is not present. |

Each individual field of the OTDOA-ReferenceCellInfo is described in the following.

TABLE 8

OTDOA-ReferenceCellInfo field description physCellId
This field specifies the physical cell identity of the assistance data reference cell.
cellGloband
This field specifies the ECGI, the globally unique identity of a cell in E-UTRA, of the assistance data reference cell. The server should include this field if it considers that it is needed to resolve ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference signals (CRS) are used in the assistance data reference cell.
cpLength
This field specifies the cyclic prefix length of the assistance data reference cell PRS if the prsInfo field is present, otherwise this field specifies the cyclic prefix length of the assistance data reference cell CRS.
prsInfo
This field specifies the PRS configuration of the assistance data reference cell.

Meanwhile, OTDOA-NeighbourCellInfo corresponds to cells (e.g., an eNB or a TP) becoming a target of RSTD measurement and can include information on maximum 24 neighbor cells according to each frequency layer for maximum 3 frequency layers. In particular, it may be able to inform a UE of information on 72 (3*24) cells in total.

TABLE 9

```
-- ASN1START
  OTDOA-NeighbourCellInfoList ::= SEQUENCE (SIZE (1..maxFreqLayers) OF
OTDOA-NeighbourFreqInfo
  OTDOA-NeighbourFreqInfo ::= SEQUENCE (SIZE (1..24)) OF OTDOA-
NeighbourFreqInfoElement
  OTDOA-NeighbourFreqInfoElement ::= SEQUENCE {
  physCellId                                INTEGER
(0..503),
            cellGlobalId            ECGI
  OPTIONAL,             - Need ON
            earfcn                  ARFCN-
  alueEUTRA         OPTIONAL,         -- Cond NotSameAsRef0
            cpLength                ENUMERATED
{normal, extended, . . . }
    OPTIONAL ,                        -- Cond NotSameAsRef1
    prsInfo                           PRS-Info
    OPTIONAL,                         -- Cond NotSameAsRef2
    antennaPortConfig                 ENUMERATED {ports-
1-or-2, ports-4, . . . }
    OPTIONAL,                         -- Cond NotsameAsRef3
    slotNumberOffset                  INTEGER (0..19)
        OPTIONAL,         -- Cond NotSameAsRef4
    prs-Subrame( )ffset               INTEGER (II..1279)
        OPTIONAL,         -- Cond InterFreq
    expectedRSTD-Uncertainty  INTEGER (0..16383),
    ...,
    [[ earfcn-v9a0                    ARFCN-ValueEUTRA-v9a0
    OPTIONAL              -- Cond NotSameAsRef5]]
  }
    maxFreqLayers                     INTEGER ::= 3
-- ASN1STOP
```

In this case, conditional presences are shown in the following.

TABLE 10

| Conditional presence | Description |
| --- | --- |
| NotSameAsRef0 | The field is absent if earfcn-v9a0 is present. If earfcn-v9a0 is not present, the field is mandatory present if the EARFCN is not the same as for the assistance data reference cell; otherwise it is not present. |
| NotSameAsRef1 | The field is mandatory present if the cyclic prefix length is not the same as for the assistance data reference cell; otherwise it is not present. |
| NotSameAsRef2 | The field is mandatory present if the PRS configuration is not the same as for the assistance data reference cell; otherwise it is not present. |
| NotSameAsRef3 | The field is mandatory present if the antenna port configuration is not the same as for the assistance data reference cell; otherwise it is not present. |
| NotSameAsRef4 | The field is mandatory present if the slot timing is not the same as for the assistance data reference cell; otherwise it is not present. |
| NotSameAsRef5 | The field is absent if earfcn is present. If earfcn is not present, the field is mandatory present if the EARFCN is not the same as for the assistance data reference cell; otherwise it is not present. |
| InterFreq | The field is optionally present, need OP, if the EARFCN is not the same as for the assistance data reference cell; otherwise it is not present. |

Each individual field of the OTDOA-NeighbourCellInfoList is described in the following.

TABLE 11

OTDOA-NeighbourCellInfoList field description
physCellId
This field specifies the physical cell identity of the assistance data reference cell.
cellGloband
This field specifies the ECGI, the globally unique identity of a cell in E-UTRA, of the assistance data reference cell. The server should include this field if it considers that it is needed to resolve ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference signals (CRS) are used in the assistance data reference cell.
cpLength
This field specifies the cyclic prefix length of the neigbour cell PRS if PRS are present in this neighbour cell, otherwise this field specifies the cyclic prefix length of CRS in this neighbour cell.
prsInfo
This field specifies the PRS configuration of the neighbour cell.
When the EARFCN of the neighbour cell is the same as for the assistance data reference cell, the target device may assume
that each PRS positioning occasion in the neighbour cell at least partially overlaps with a PRS positioning occasion in the assistance data reference cell where the maximum offset between the transmitted PRS positioning occasions may be assumed to not exceed half a subframe.
When the EARFCN of the neighbour cell is the same as for the assistance data reference cell, the target device may assume that this cell has the same PRS periodicity (Tprs) as the assistance data reference cell.

In this case, PRS-Info corresponding to an IE, which is included in the OTDOA-ReferenceCellInfo and the OTDOA-NeighbourCellInfo, includes PRS information. Specifically, the PRS-Info is configured as follows while including PRS Bandwidth, PRS Configuration Index (IPRS), Number of Consecutive Downlink Subframes, and PRS Muting Information.

TABLE 12

```
PRS-Info ::= SEQUENCE {
    prs-Bandwidth              ENUMERATED { n6, n15, n25, n50, n75, n100, ... },
    prs-ConfigurationIndex     INTEGER (0..4095),
    numDL-Frames               ENUMERATED {sf-1, sf-2, sf-4, sf-6, ... },
    ...,
    prs-MutingInfo-r9          CHOICE {
        po2-r9                      BIT STRING (SIZE(2)),
        p04-r9                      BIT STRING (SIZE(4)),
        po8-r9                      BIT STRING (SIZE(S)),
        po16-r9                     BIT STRING (SIZE(16)),
        ...
    }
    OPTIONAL                   -- Need OP
}
-- ASN1STOP
```

Figure 6:
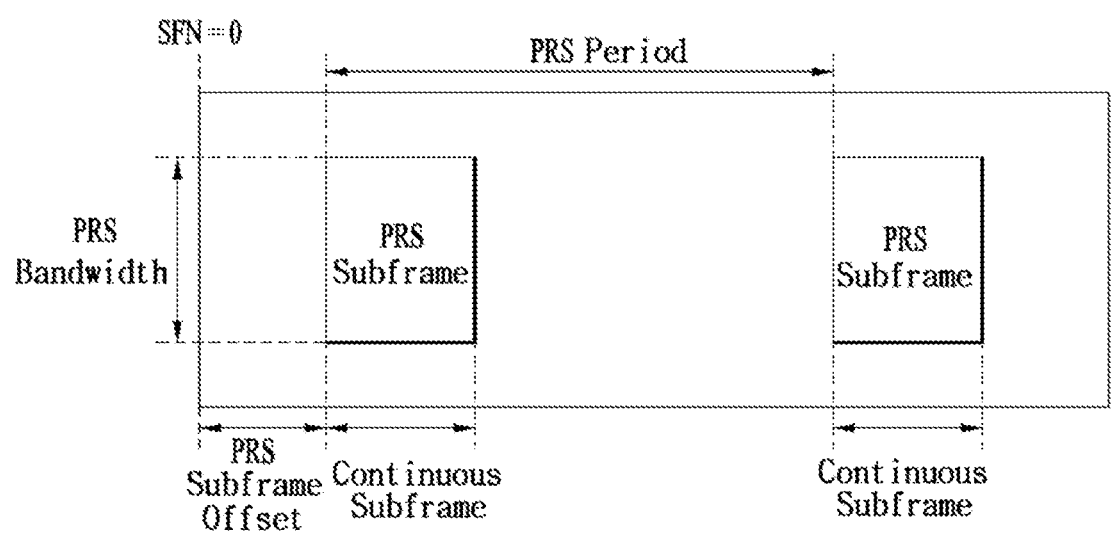
FIG. 6 illustrates a structure for transmitting a positioning reference signal (PRS).

FIG. 6 is a diagram for a PRS transmission structure according to the parameters.

In this case, PRS periodicity and PRS subframe offset are determined according to a value of PRS configuration index (IPRS) and a corresponding relation is shown in the following table.

TABLE 13

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-23399 | 1280 | $I_{PRS}$-1120 |

[PRS (Positioning Reference Signal)]

A PRS has a transmission occasion, that is, a positioning occasion at intervals of 160, 320, 640, or 1280 ms. The PRS may be transmitted in N consecutive DL subframes at the positioning occasion, where N may be 1, 2, 4, or 6. Although the PRS may be substantially transmitted at the positioning occasion, it may be muted for inter-cell interference control cooperation. Information on PRS muting is signaled to a UE through prs-MutingInfo. Unlike a system bandwidth of a serving BS, a PRB transmission bandwidth may be independently configured and the PRS is transmitted in a frequency bandwidth of 6, 15, 25, 50, 75, or 100 resource blocks (RBs). A transmission sequence for the PRS is generated by initializing a pseudo-random sequence generator for every OFDM symbol using a function of a slot index, an OFDM symbol index, a cyclic prefix (CP) type, and a cell ID. The generated transmission sequences for the PRS can be differently mapped to resource elements (REs) based on whether a normal CP or extended CP is used. A position of the mapped RE may be shifted on the frequency axis, and in this case, a shift value is determined by a cell ID.

For PRS measurement, a UE receives configuration information on a list of PRSs that the UE should search for from a positioning server of the network. The corresponding information includes PRS configuration information of a reference cell and PRS configuration information of neighboring cells. Configuration information for each PRS includes a generation period of the positioning occasion and offset thereof, the number of consecutive DL subframes included in one positioning occasion, a cell ID used in generating a PRS sequence, a CP type, the number of CRS antenna ports considered in PRS mapping, etc. In addition, the PRS configuration information of neighboring cells includes slot offsets and subframe offsets of the neighbor cells and reference cell, expected RSTD, and a degree of uncertainty of the expected RSTD. Thus, the PRS configuration information of neighboring cells supports the UE to determine when and which time window the UE should search for corresponding PRSs to detect PRSs transmitted from the neighboring cells.

For example, FIG. 7 is a diagram illustrating mapping of a PRS to resource elements. A transmission sequence for the PRS is generated by initializing a pseudo-random sequence generator for every OFDM symbol using a function of a slot index, an OFDM symbol index, a cyclic prefix (CP) type, and a physical cell ID. When a normal CP is used, the generated sequences can be mapped as shown in FIG. 7(a). When an extended CP is sued, the generated sequences can be mapped as shown in FIG. 7(b). A position of the mapped RE may be shifted on the frequency axis, and a shift value is determined by the physical cell ID. In this case, for example, the positions of REs for PRS transmission shown in FIGS. 7 (a) and (b) may be calculated on the assumption that the frequency shift is 0.

Meanwhile, the aforementioned RSTD may mean a relative timing difference between adjacent or neighboring cell j and reference cell i. That is, the RSTD can be expressed as $T_{subframeRxj} - T_{subframeRxi}$, where $T_{subframeRxj}$ indicates a time when the UE receives the start of a specific subframe from the adjacent cell j, and $T_{subframeRxi}$ indicates a time when the UE receives the start of a subframe corresponding to the specific subframe from the reference cell i, which is closest in time to the specific subframe received from the adjacent cell j. The reference point for the observed subframe time difference could be an antenna connector of the UE.

As described above, the network can obtain position information of the UE in the wireless communication system using various methods.

As another example, the UE's position can be measured using phase information in the wireless communication system. For instance, a distance may be primarily influenced by hardware components but less influenced by phase differences. In a single antenna system, Equation 1 below may be used to calculate a distance. In Equation 1, d is a distance, λ is a wavelength, Ø is a phase difference between transmitted and received signals, and n is a positive integer.

$$d = \frac{\lambda}{2}\left(\frac{\phi}{2\pi} + n\right) \qquad \text{[Equation 1]}$$

In Equation 1, the distance d may be determined according to λ/2 irrespective of the phase change, Ø. In detail, Ø can be determined according to an internal phase $Ø_{int}$ and a propagation phase $Ø_{prop}$ as shown in Equation 2 below. However, in Equation 2, $Ø_{int}$ is an initial value and cannot be calculated. Thus, the distance d can be measured based on λ/2 regardless of the phase change in Equation 1.

$$Ø = Ø_{int} + Ø_{prop} \qquad \text{[Equation 2]}$$

However, for example, when two different frequencies are used, the above-described $Ø_{int}$ factor can be eliminated in the calculation. Specifically, if the different frequencies have the same $Ø_{int}$ value, it can be eliminated in the calculation, and thus position measurement can be performed using phase information. In this case, a phase difference of arrival (PDOA) scheme may be used to measure a distance using different frequencies. According to the PDOA scheme, a position is measured using a phase difference at difference frequencies with respect to a received signal.

In detail, when the position measurement is performed based on the PDOA scheme, two basic frequencies may be used. For example, a RFID reader can transmit two continuous wave signals at frequencies $f_1$ and $f_2$. In this case, a phase at frequency i can be expressed as shown in Equation 3 below irrespective of modulation and noise of the RFID. In this case, i may have a value of 1 or 2, and c indicates the propagation velocity or the speed of light, i.e., $c = 3 \times 10^8$.

$$Ø_i = 4\pi f_i d/c \qquad \text{[Equation 3]}$$

The value of d can be calculated according to Equation 3. That is, the phase difference is present as many as the frequency difference, and this can be expressed as shown in Equation 4. In this case, the conditions of $0 \leq \emptyset_i < 2\pi$ and $0 \leq \Delta\emptyset = \emptyset_2 - \emptyset_1 < 2\pi$ can be satisfied.

$$\hat{d} = \frac{c\Delta\phi}{4\pi(f_2 - f_1)} + \frac{cm}{2(f_2 - f_1)} \qquad [\text{Equation 4}]$$

For example, in Equation 4, the second term may denote range ambiguity due to phase wrapping. The maximum value of an ambiguous distance may be expressed as $d_{max} = c/2|f_2 - f_1|$. In other words, as the frequency difference is decreased, the maximum value of the ambiguous distance may be increased. However, when the frequency difference is decreased, the performance may be significantly degraded due to noise. In addition, considering that a prescribed range of frequencies are used in the wireless communication system, the problem of how the frequencies are apart should be solved. That is, the frequency range used in the system and the above-mentioned error are in the trade-off relationship, and thus a frequency to be used for the PDOA scheme can be selected in consideration of the frequency range and error. Moreover, when two frequencies are used, an error may be caused by the fade phenomenon for one of the two frequencies. Thus, the position measurement can also be performed using at least two frequencies, and details will be described later.

Figure 8:
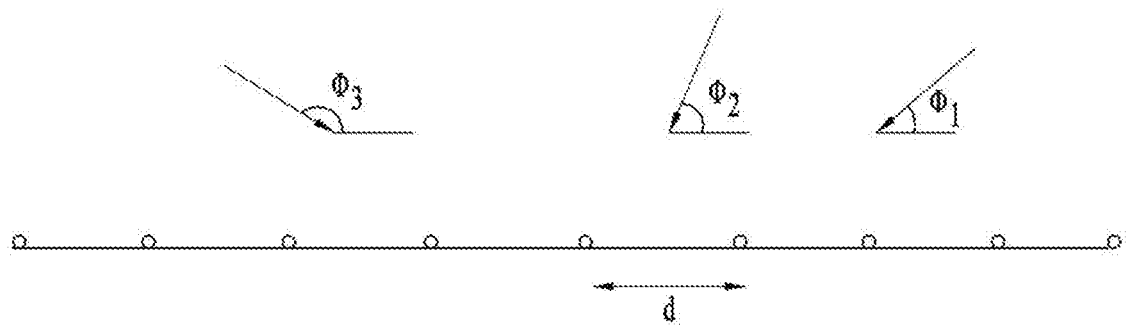
FIG. 8 is a diagram illustrating a method of estimating a direction of arrival (DOA).

As a further example, a direction of arrival (DOA) scheme may be considered. Referring to FIG. 8, each of a plurality of signals (M signals) may have its own directions $\emptyset_i$. According to the DOA scheme, the directions of received signals may be estimated. That is, the direction of a received signal may be estimated and determined from the received signal using the DOA scheme.

Hereinafter, a method of estimating a position based on the above-described PDOA scheme will be described. Specifically, when a position is estimated based on the PDOA scheme, a BS may obtain information on a distance between UEs or information on a distance difference therebetween. Thus, even if the PDOA scheme is applied, additional information may be further required to measure the position of a UE. Accordingly, a method of transmitting the additional information needs to be considered.

A BS may transmit a specific reference signal (i.e., a reference signal that can be identified by each transmitting end) to a UE. Upon receiving the reference signal from each BS, the UE may measure the received reference signal, calculate a positioning estimate based on the PDOA scheme, and then report the positioning estimate to the BS. The BS may calculate the position of the corresponding UE based on the information reported by the UE.

For example, the UE may transmit information on its DOA capability to the BS or a location server. In this case, the accuracy or resolution of DOA estimation may be predefined or preconfigured.

Specifically, if a UE intends to perform PDOA-based positioning using one BS, the UE should be able to calculate the distance to the BS and the direction thereof. However, if the UE performs the positioning based on a phase difference between reference signals transmitted on two different frequencies, the UE may obtain only the distance to the BS. That is, the UE may further require information on the direction of the BS. In this case, the UE may obtain the direction of a signal transmitted from the BS from the above-described DOA estimation. In other words, if the UE intends to perform the PDOA-based positioning using one BS, the UE should be able to obtain highly accurate DOA information. The UE may transmit to the network information indicating whether the UE has an antenna array capable of performing accurate DOA estimation through physical layer signaling or higher layer signaling (e.g., RRC signaling). That is, the UE may transmit the DOA capability information to the BS. Upon receiving the information indicating whether the UE is equipped with the antenna array capable of performing the accurate DOA estimation, the BS may forward the information to the location server. In other words, the BS may forward the DOA capability information received from the UE to the location server.

For example, when the BS forwards the DOA capability information to the location server, the BS may transmit, to the location server, information for identifying the corresponding UE together with the DOA capability information. Since the location server should identify the corresponding UE, the BS may transmit the information for identifying the UE such as a unique UE ID, a phone number, etc.

As another example, the location server may trigger a procedure for obtaining the UE's DOA capability information. Specifically, the location server may not know whether the UE is equipped with the antenna array capable of performing the accurate DOA estimation. Thus, the location server may request the UE that performs the PDOA-based positioning using the BS to transmit a value measured by the antenna array capable of performing the accurate DOA estimation.

Upon receiving the request, the UE may report information on a measured DOA through physical layer signaling or higher layer signaling if the UE is equipped with the antenna array capable of performing the accurate DOA estimation.

Meanwhile, upon receiving the request, the UE may set a field related to the DOA capability information to a predefined value and transmit the field to the BS if the UE is not equipped with the antenna array capable of performing the accurate DOA estimation. Alternatively, the UE may transmit PDOA-related information to the BS without the field related to the DOA capability information. The BS may forward the information received from the UE to the location server.

As a further example, the UE may transmit the PDOA-related information to the BS. When the BS transmits the reference signal to the UE as described above, the UE may transmit the PDOA-related information to the BS based on the reference signal. In this case, the PDOA-related information may include the above-described DOA capability information. In addition, the PDOA-related information may include other information required for position estimation. However, the present disclosure is not limited thereto. The BS may forward the PDOA-related information received from the UE to the location server.

Figure 9:
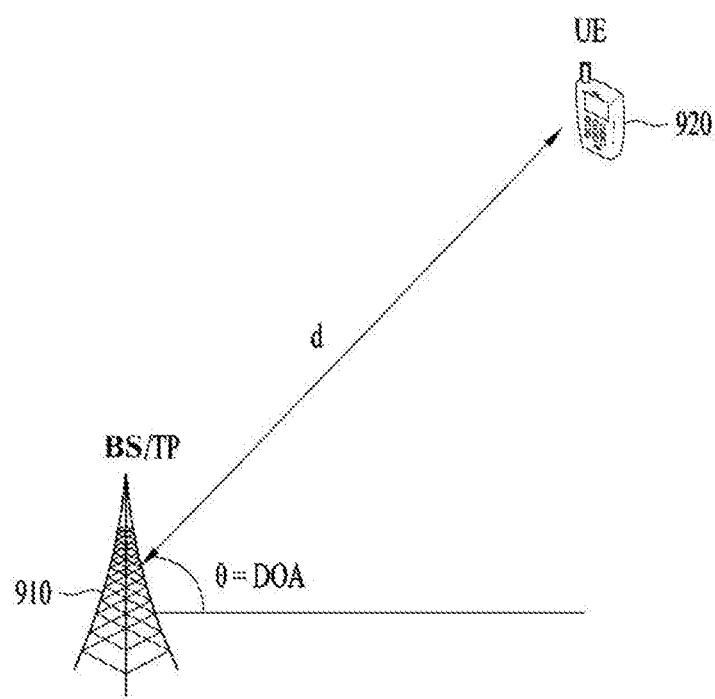
FIG. 9 is a diagram illustrating a method by which a BS (or a transmission point (TP)) estimates the position of a UE using a PDOA scheme.

Referring to FIG. 9, a BS (or a transmission point (TP)) 910 may estimate the position of a UE 920 using the above-described PDOA scheme. When the PDOA scheme is applied, the BS 910 may receive, from the UE 920, reference signals transmitted on two (or more) frequencies. The BS 910 may obtain phase difference information based on the frequency difference between the received reference signals and estimate the position of the UE 920 from the phase difference. However, when estimating the position of the UE 920 according to the PDOA scheme, the BS 910 may obtain only the distance between the BS 910 and the UE 920. In this case, since one BS (BS 910) is involved in estimating the position of the UE 920, only the relative distance may be obtained. As a result, direction information may be further required. On the other hand, when multiple BS are involved in estimating the position of the UE 920, the BS 910 may estimate the position of the UE 920 from the positions of the multiple BSs. In this case, the positions of the multiple BSs may be fixed and informed in advance. When one BS (BS 910) is involved in estimating the position of the UE 920, the BS 910 may obtain only the relative position of the UE 920 since the BS 910 know only the distance therebetween. Therefore, the BS 910 needs to know the direction of a signal transmitted from the UE 920. That is, the BS 910 needs to obtain DOA information.

In this case, the BS 910 may transmit, to a location server, DOA capability information indicating whether it has DOA estimation capability. That is, the BS 910 may transmit, to the location server, information indicating whether it has the DOA estimation capability based on an antenna array. In this case, the resolution of DOA estimation accuracy may be predefined or preconfigured. In addition, the BS 910 may transmit the DOA capability information of the BS 910 to the UE 920. The UE 920 may forward the information received from the BS 910 to the location server. However, the present disclosure is not limited thereto.

For example, if the location server does not know whether the BS has an antenna array capable of performing accurate DOA estimation, the location server may request the BS that performs PDOA-based positioning to transmit a value measured by the antenna array capable of performing the accurate DOA estimation.

In this case, if the BS is equipped with the antenna array capable of performing the DOA estimation, the BS may measure DOA information and report the measured DOA information through physical layer signaling or higher layer signaling.

On the contrary, if the BS is not equipped with the antenna array capable of performing the DOA estimation, the BS may set a field related to DOA capability information to a predefined value and transmit the field to the location server. Alternatively, the BS may transmit PDOA-related information to the location server without the field related to the DOA capability information.

As another example, the UE 920 may be requested to transmit different information depending on whether one or a plurality of BSs are involved in estimating the position of the UE.

When one BS is involved in estimating the position of the UE, the BS may request the UE to transmit UE's DOA capability information Upon receiving the DOA capability information from the UE, the BS may determine a method of estimating the position of the UE. However, the present disclosure is not limited thereto.

When one BS is involved in PDOA-based positioning, the BS may indicate to a UE information that the BS desires to receive, and the UE may report the corresponding information. That is, the UE may report the information requested by the BS only, thereby reducing overhead.

Specifically, when one BS is involved in estimating the position of a UE based on PDOA, the BS may request the UE to report a phase difference between predetermined frequencies and the DOA value of a received signal. In this case, each frequency (or tone) may have different accuracy. For example, if adjacent frequencies are used, a phase difference therebetween decreases, and as a result, an error may increase. As a frequency difference increases, the performance of positioning may increase. Since such frequency information may be required for the positioning, the BS may request the UE to report the frequency information.

Alternatively, the BS may request the UE to transmit information on phase differences between two or more frequencies and, at the same time, indicate to the UE how to report the information. Then, the UE may report the information to the BS.

If the BS intends to estimate the position of the UE based on the PDOA scheme without support from other BSs, the UE needs to measure a phase difference between at least two frequencies and report the phase difference to the BS. For example, when the UE is requested to transmit a phase difference between f1 and f2, the UE may report to the BS the phase difference between signals corresponding to the two frequencies and the DOA values of the received signals.

In addition, the BS may request information on phase differences between multiple frequencies. For example, if the BS requests to the UE to transmit information on f1, f2, and f3, the UE may report a phase difference between f1 and f2, a phase difference between f1 and f3, and a phase difference between f2 and f3 to the BS. When multiple phase differences are reported, diversity gain may be obtained, thereby improving performance.

The UE may select K frequencies with high power from among two or more frequency reference signals. For example, assuming that the BS indicates to the UE that K=2 and frequencies available for the UE are f1, f2, f3, and f4, the UE may select two frequencies with high power from among f1, f2, f3, and f4 and then report a phase difference therebetween to the BS. If f2 and f4 have high power, the UE may report a phase difference between f2 and f4 to the BS. In this case, the UE may report the indices of the selected frequencies. The present disclosure is not limited thereto.

If K is equal to or more than 3, the UE may report the average phase difference.

The BS may request the UE to transmit information on phase differences between two or more frequencies and, at the same time, indicate to the UE how to report the information. Then, the UE may transmit corresponding information to the BS according to the instruction.

When the BS attempts to estimate the position of the UE based on the PDOA scheme, the BS may obtain an approximate position of the UE from the power of a received signal. For example, the BS may obtain the approximate position of the UE from large scale fading of the received signal power. Thus, distance ambiguity, which is caused since phases are repeated every $2\pi$, may be solved. By obtaining the approximate position and checking the position using the above-described PDOA scheme, the BS may improve the positioning accuracy. The BS may instruct the UE to report measurement information such as signal power, signal strength quality, etc., as the PDOA-related information.

The UE may receive a signal through multiple paths using an antenna array. In this case, the BS may request the UE to report a phase difference between frequencies for each path. Upon receiving the request from the BS, the UE may report corresponding information to the BS.

Specifically, the UE may separate a signal for each path using a spatial filter. By doing so, the UE may obtain information on a phase difference between specific frequencies for each path and report the per path information to the BS.

The BS may request to the UE to report information on some of all the paths. In this case, the UE may measure phase differences between frequencies for the requested paths and then report the measured phase differences to the BS.

The BS may request to the UE to report whether the UE is capable of distinguishing between multiple paths, and the UE may report to the BS whether the UE is capable of distinguishing between multiple paths. The BS may forward the information to the location server. The capability of distinguishing between multiple paths may be included in the PDOA-related information.

When the BS performs the PDOA-based positioning, the BS may transmit to the UE measurement information, i.e., information on the number of paths where the UE should measure phase differences through common control signaling or broadcasting. For example, the measurement information may be indicated by an indication field. If the indication field is one bit, indication 0 may indicate phase 1, and indication 1 may indicate phases 1 and 2.

In phase measurement, an error may decrease as the strength of a signal increases. Thus, a specific path may be selected from multiple paths by considering both power and phase difference. For example, the UE may measure reference signal received power (RSRP) or reference signal received quality (RSRQ) for multiple paths and then report information on a path with the highest RSRP or RSRQ to the BS.

If the number of actually used paths is smaller than the number of paths configurable for the UE, the UE may set an unused path(s) to a specific or predetermined value and then report the unused path to the BS. Thus, the BS may obtain information on the unused path.

According to the PDOA scheme, if the BS knows an approximate distance to the UE, a phase difference may be proportional to the distance within an ambiguous range. Accordingly, among values measured for multiple paths, a value with the smallest phase difference may be considered as line of sight (LOS). To improve the positioning accuracy, the UE may report information on a path corresponding to the value with the smallest phase difference to the BS.

The BS may request the UE to transmit information required to estimate the position of the UE based on the PDOA scheme. Upon receiving the request from the BS, the UE may report the PDOA-related information to the BS. The present disclosure is not limited thereto.

The UE may report a signal for the PDOA-based positioning based on reference signals received from multiple BSs. For example, the reference signals transmitted from the BSs may be orthogonal to each other. In this case, information on the reference signals may be broadcast or transmitted through higher layer signaling.

When the UE is incapable of performing accurate DOA estimation, the UE may measure the PDOA-related information for the signals received from the multiple BSs and report the measured information. If the positions of the multiple BSs are known in advance, the BS may estimate the position of the UE using multilateral measurement.

Figure 10:
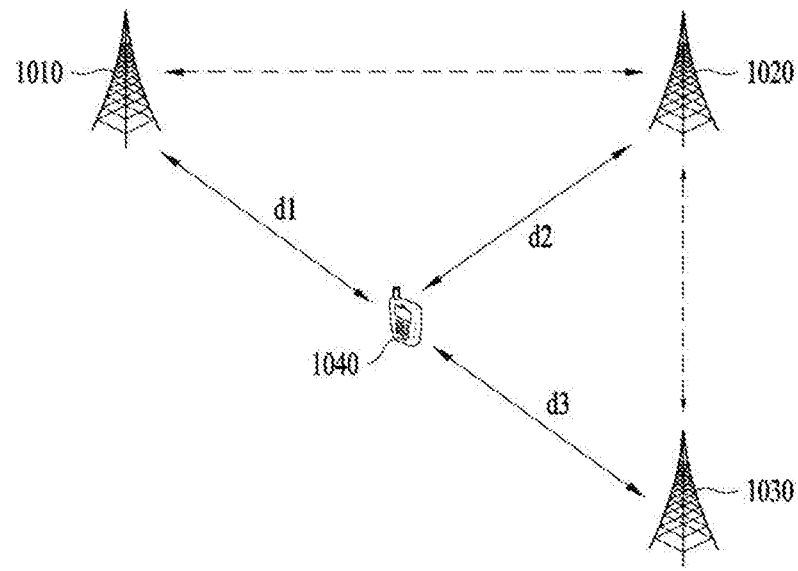
FIG. 10 is a diagram illustrating a method of estimating the position of a UE using a plurality BSs.

Referring to FIG. 10, a UE 1040 may have no DOA estimation capability. In this case, if the UE 1040 performs PDOA-based positioning using one BS, the UE 1040 may obtain the relative distance to the BS but may not obtain direction information. Alternatively, the UE 1040 may perform the positioning using a plurality of BSs 1010, 1020, and 1030. In this case, if a BS end knows the positions of the BSs 1010, 1020, and 1030, the BS end may obtain PDOA information for the UE 1040 and each of the BSs 1010, 1020, and 1030 based on the PDOA scheme. That is, the BS end may estimate the position of the UE 1040.

The BS end may perform the PDOA-based positioning in a similar way to the OTDOA scheme. The BS end may include the cell IDs of the BSs 1010, 1020, and 1030, for which the UE should perform measurement, in information to be transmitted to the UE 1040. That is, the BS end may transmit, to the UE 1040, the IDs of the BSs 1010, 1020, and 1030. The UE 1040 may measure the PDOA-related information for the BSs 1010, 1020, and 1030 and then report the PDOA-related information to the BS end. In addition, the UE 1040 may transmit the PDOA-related information for the BSs 1010, 1020, and 1030 to a location server. The present disclosure is not limited thereto.

By considering that the BSs 1010, 1020, and 1030 are involved in the positioning, the UE 1040 may report to the BS end the PDOA-related information for the BSs 1010, 1020, and 1030.

To identify which BS PDOA-related information relates to, the BS end may transmit the cell IDs of the BSs. Alternatively, the UE may report PDOA measurement values in order of the cell IDs of the BSs 1010, 1020, and 1030 that the UE should measure. That is, upon receiving the request from the BS end, the UE may measure the PDOA-related information for the BSs 1010, 1020, and 1030 and then report the measured PDOA-related information to the BS end.

Further, the above-described configuration may be equally applied when a UE transmits a reference signal to a BS and the BS performs reporting thereon. However, the present disclosure is not limited thereto.

Figure 11:
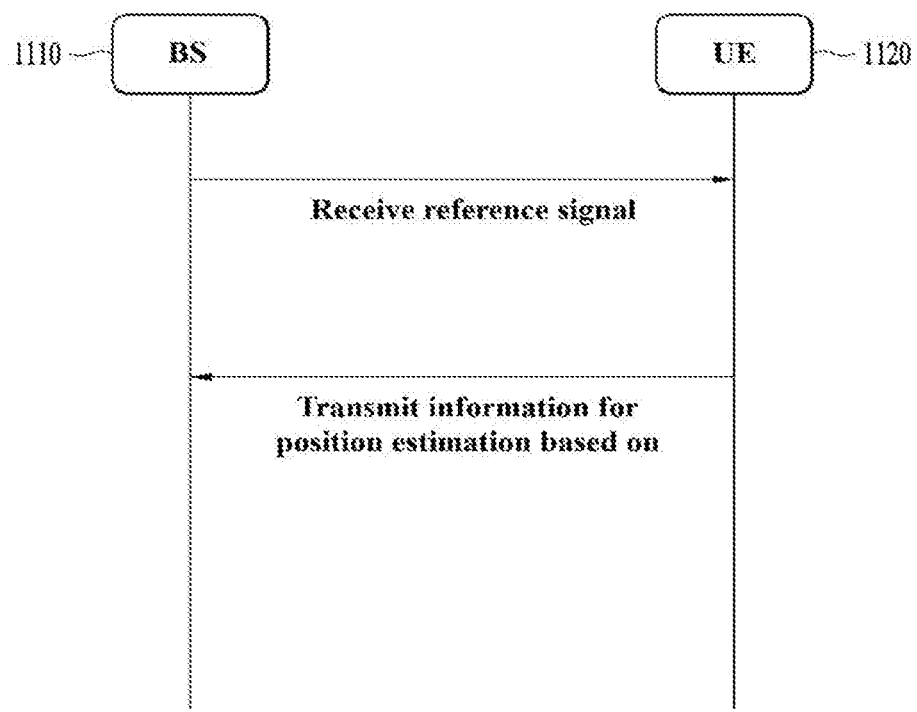
FIG. 11 is a diagram illustrating a method by which a UE transmits information for position estimation.

FIG. 11 is a diagram illustrating a method by which a UE transmits information for position estimation.

A BS 1110 may transmit a reference signal to a UE 1120. In this case, the reference signal may correspond to a reference signal for distance measurement. Thereafter, the UE 1120 may transmit information for position estimation (position estimation information) to the BS 1110 based on the reference signal. The BS 1110 may transmit to the UE 1120 reference signals on two different frequencies. The UE 1120 may calculate a phase difference between the reference signals received on the individual frequencies and then transmit information on the phase difference to the BS. That is, the position estimation information transmitted by the UE 1120 may correspond to PDOA-related information, i.e., information about a phase difference. The PDOA-related information may correspond to DOA information. If one BS 1110 is involved in estimating the position of the UE 1120, the UE 1120 may obtain the distance to the BS 1110 according to the above-described PDOA scheme. However, direction information may be further required to estimate the position of the UE 1120. Thus, the UE 1120 may further transmit DOA information as the PDOA-related information to the BS 1110.

Figure 12:
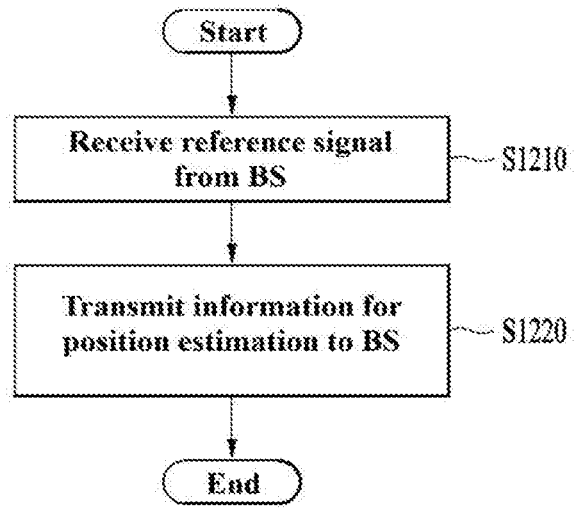
FIG. 12 is a diagram illustrating a method by which a UE transmits information for position estimation.

FIG. 12 is a diagram illustrating a method by which a UE transmits information for position estimation.

A UE may receive a reference signal from a BS (S1210). Thereafter, the UE may transmit information for position estimation to the BS based on the reference signal (S1220). In this case, as described above with reference to FIGS. 1 to 11, the position estimation information may correspond to PDOA-related information. The PDOA-related information may include information on UE's DOA capability. The BS may determine how to estimate the position of the UE based on the UE's DOA capability information. When one BS is involved in estimating the position of the UE, DOA information may be included in the PDOD information.

The PDOA information may correspond to phase difference information. As described above, the BS may transmit to the UE reference signals for distance measurement on two different frequencies. Alternatively, the BS may transmit to the UE reference signals for distance measurement on multiple frequencies. The UE may obtain a phase difference using a signal received on each frequency. For example, phase difference information for the multiple frequencies may correspond to information on a phase difference between two frequencies among the multiple frequencies. The two frequencies may include all possible combination cases. Alternatively, as the two frequencies, frequencies with highest reference signal power may be determined.

The UE may transmit the PDOA-related information to the BS based on the reference signal received from the BS, and the BS may estimate the position of the UE based on the PDOA-related information.

Figure 13:
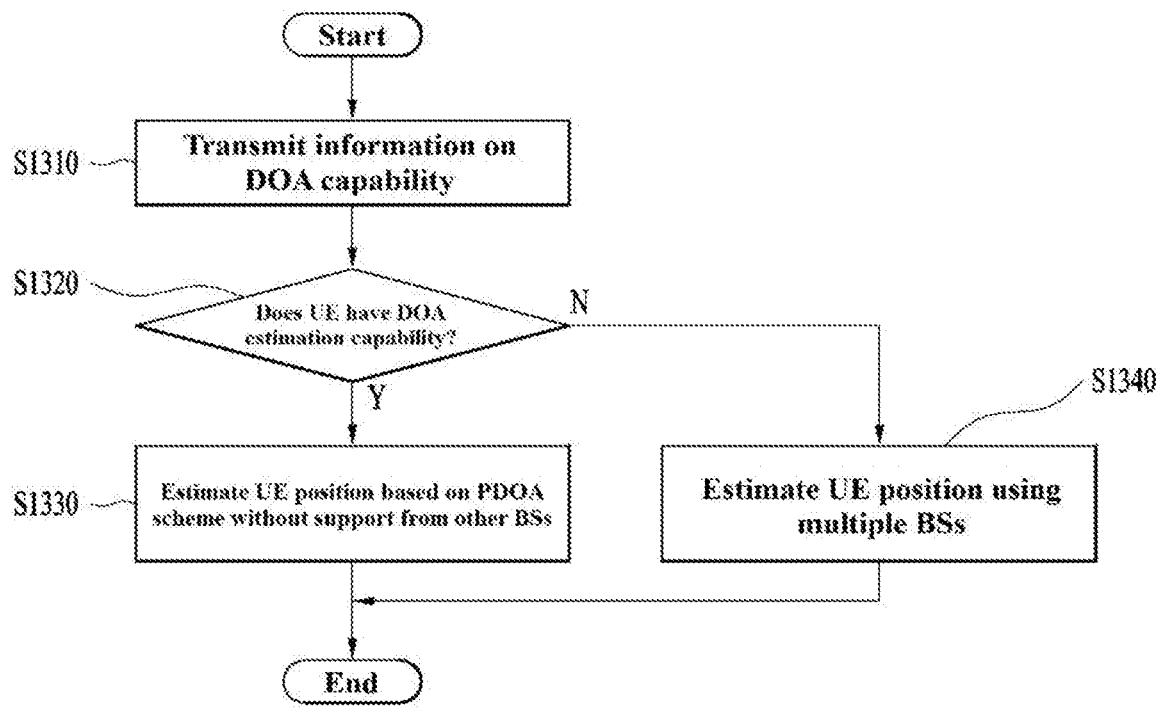
FIG. 13 is a diagram illustrating a method by which a UE transmits information for position estimation.

FIG. 13 is a diagram illustrating a method by which a UE transmits information for position estimation.

A BS (or a location server) may receive information on UE's DOA capability (S1310). As described above with reference to FIGS. 1 to 12, the DOA capability information may correspond to information indicating whether accurate DOA estimation is performed or not. In this case, the DOA estimation capability may be determined by an antenna array.

When the UE has the DOA estimation capability (S1320), the BS may estimate the position of the UE based on the PDOA scheme without support from other BSs (S1330). As described above with reference to FIGS. 1 to 12, when the UE has the DOA estimation capability, the UE may estimate the direction of a received signal. The UE may obtain the relative distance to the BS using a phase difference between reference signals received on multiple frequencies and also obtain direction information using the DOA estimation capability. The BS may estimate the position of the UE based thereon.

On the contrary, when the UE has no DOA estimation capability (S1320), the BS may estimate the position of the UE using multiple BSs (S1340). As described above with reference to FIGS. 1 to 12, the positions of the multiple BSs are fixed, and the BS that intends to estimate the position of the UE may know the positions of the multiple BSs. The UE may receive a reference signal from each of the multiple BSs. Each BS may transmit the reference signal on multiple frequencies. The UE may obtain phase difference information for each of the multiple BSs. In addition, the UE may obtain the distance to each of the multiple BSs based on the phase difference information. In this case, since the multiple BSs are fixed and the BS knows their positions, the BS may estimate the position of the UE based thereon.

In summary, the position of a UE may be estimated in a different way depending on whether the UE has DOA estimation capability, but the present disclosure is not limited thereto.

The embodiments of the present invention mentioned in the foregoing description can be implemented using various means. For instance, the embodiments of the present invention can be implemented using hardware, firmware, software and/or any combinations thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

In addition, both an apparatus invention and a method invention are explained in the present specification, and if necessary, the explanation on both the inventions can be complementally applied.

INDUSTRIAL APPLICABILITY

The above-described method can be applied to not only the 3GPP LTE/LTE-A system but also various wireless communication systems including an IEEE 802.16x system and an IEEE 802.11x system. Further, the proposed method can also be applied to a mmWave communication system using ultra high frequency bands.

The invention claimed is:

1. A method of transmitting information for position estimation by a user equipment (UE) in a wireless communication system, the method comprising:
  receiving a reference signal from a base station (BS); and
  transmitting the information for the position estimation to the BS based on the reference signal,
  wherein the information for the position estimation corresponds to information related to phase difference of arrival (PDOA), and
  wherein the PDOA-related information includes information regarding direction of arrival (DOA) capability of the UE.

2. The method of claim 1, wherein only when one BS is involved in estimating a position of the UE, the PDOA-related information includes the information regarding the DOA capability of the UE.

3. The method of claim 1, wherein the PDOA-related information corresponds to phase difference information.

4. The method of claim 3, wherein when the position estimation is performed based on the PDOA, the UE receives reference signals on a first frequency and a second frequency, and wherein the phase difference information corresponds to information about a phase difference between the reference signal received on the first frequency and the reference signal received on the second frequency.

5. The method of claim 4, wherein the PDOA-related information further includes at least one of (i) power and signal strength of the reference signal received on the first frequency, or (ii) power and signal strength of the reference signal received on the second frequency.

6. The method of claim 3, wherein when the position estimation is performed based on the PDOA, the UE receives reference signals on two or more frequencies and determines the phase difference information based on phase differences between the reference signals received on the two or more frequencies.

7. The method of claim 6, wherein the phase difference information is determined based on a phase difference between two reference signals with highest power among the reference signals received on the two or more frequencies.

8. The method of claim 1, wherein when a plurality of BSs are involved in estimating a position of the UE, the PDOA-related information includes PDOA information for the plurality of BSs.

9. The method of claim 8, wherein the UE receives reference signals from the plurality of BSs and determines the PDOA information for the plurality of BSs based on the received reference signals.

10. The method of claim 9, wherein the PDOA-related information further includes identification information regarding each of the plurality of BSs.

11. A user equipment (UE) configured to transmit information for position estimation in a wireless communication system, the UE comprising:
 at least one transceiver;
 at least one processor; and
 at least one computer memory operably connectable to the at least one processor and storing instructions that, based on being executed by the at least one processor, perform operations comprising:
 receiving, through the transceiver, a reference signal from a base station (BS); and
 transmitting, through the transceiver, the information for the position estimation to the BS based on the reference signal,
 wherein the information for the position estimation corresponds to information related to phase difference of arrival (PDOA), and
 wherein the PDOA-related information includes information regarding direction of arrival (DOA) capability of the UE.

12. The UE of claim 11, wherein only when one BS is involved in estimating a position of the UE, the PDOA-related information includes the information regarding the DOA capability of the UE.

13. The UE of claim 11, wherein the PDOA-related information corresponds to phase difference information,
 wherein when the position estimation is performed based on the PDOA, the UE receives reference signals on a first frequency and a second frequency, and
 wherein the phase difference information corresponds to information about a phase difference between the reference signals received on the first frequency and the reference signal received on the second frequency.

14. The UE of claim 11, wherein the UE is capable of communicating with at least one of another UE, a UE related to an autonomous driving vehicle, a base station or a network.

15. A processing apparatus configured to control a user equipment (UE) to transmit information for position estimation in a wireless communication system, the processing apparatus comprising:
 at least one processor; and
 at least one computer memory operably connectable to the at least one processor and storing instructions that, based on being executed by the at least one processor, perform operations comprising:
 receiving a reference signal from a base station (BS); and
 transmitting the information for the position estimation to the BS based on the reference signal,
 wherein the information for the position estimation corresponds to information related to phase difference of arrival (PDOA), and
 wherein the PDOA-related information includes information regarding direction of arrival (DOA) capability of the UE.

16. The processing apparatus of claim 15, wherein only when one BS is involved in estimating a position of the UE, the PDOA-related information includes the information regarding the DOA capability of the UE.

17. The processing apparatus of claim 15, wherein the PDOA-related information corresponds to phase difference information,
 wherein when the position estimation is performed based on the PDOA, the UE receives reference signals on a first frequency and a second frequency, and
 wherein the phase difference information corresponds to information about a phase difference between the reference signals received on the first frequency and the reference signal received on the second frequency.

* * * * *